United States Patent [19]

Mallmann

[11] Patent Number: 5,636,517
[45] Date of Patent: Jun. 10, 1997

[54] BRAKE BOOSTER

[75] Inventor: Markus Mallmann, Pfalzfeld, Germany

[73] Assignee: Lucas Industries public limited company, United Kingdom

[21] Appl. No.: 524,238

[22] Filed: Sep. 6, 1995

[30] Foreign Application Priority Data

Sep. 20, 1994 [DE] Germany .................. 94 15 262 U

[51] Int. Cl.$^6$ ............................................. B60T 11/20
[52] U.S. Cl. ........................................ 60/562; 60/585
[58] Field of Search ......................... 60/562, 583, 585, 60/586, 592

[56] References Cited

U.S. PATENT DOCUMENTS

| | | | |
|---|---|---|---|
| 3,646,759 | 3/1972 | Hughes et al. | 60/562 |
| 3,877,228 | 4/1975 | Shellhouse | 60/562 X |
| 4,127,210 | 11/1978 | Sabat | 60/562 X |
| 4,441,319 | 4/1984 | Brown | 60/562 X |
| 4,773,224 | 9/1988 | Sakamoto et al. | 60/585 X |
| 5,146,751 | 9/1992 | Savidan | 60/562 |

FOREIGN PATENT DOCUMENTS

| | | | |
|---|---|---|---|
| 1048494 | 1/1959 | Germany | 60/585 |
| 2335530 | 1/1974 | Germany | 60/585 |

*Primary Examiner*—Hoang Nguyen
*Attorney, Agent, or Firm*—Wood, Herron & Evans, P.L.L.

[57] ABSTRACT

A brake booster with a master cylinder (10) comprises: a primary piston (12) and a secondary piston (14), with the secondary piston (14) being limited in its axial movability by a stop pin (25) being accepted transversely to a longitudinal axis (L) of the master cylinder (10) in a hole (24), and a reservoir (16) for brake fluid, comprising a connection (17) via which the reservoir (16) is connected with the master cylinder (10), with the connection (17) being arranged in the radial extension of the stop pin (25), with the connection (17) comprising a transverse web (28) in its flow cross sectional area which covers the hole 24 at least partially.

7 Claims, 4 Drawing Sheets

BRAKE BOOSTER

The present invention relates to a brake booster with a master cylinder, comprising a primary piston and a secondary piston, with the secondary piston being limited in its axial movability by a stop pin accepted in a hole extending transversely to the longitudinal axis of the master cylinder, and a reservoir for brake fluid, comprising a connection via which the reservoir is connected with the master cylinder, with the connection being arranged in a radial extension of the stop pin.

After the assembly of the primary piston and the secondary piston this stop pin is pushed into the hole so that it slides through a recess in the secondary piston and is accepted in a blind hole in the opposite wall of the master cylinder.

The hole and the stop pin each are so dimensioned that the pin can be pushed into the hole without requiring a considerable force. This means that in the case of disadvantageous tolerance matching between the hole and the stop pin, the pin has such a great clearance in the hole that it could drop out of it during transport or assembly. The state of the art (FIGS. 4 and 5) provides a lock washer at the bottom of the connecting sleeve in the master cylinder. This lock washer covers the hole of the stop pin and is provided with slots or holes through which the brake fluid can flow from the reservoir into the master cylinder. A rubber seal retains the lock washer in the connecting sleeve.

The problem of this arrangement is that the lock washer as an additional component is required. Moreover, it must be verified prior to the assembly of the reservoir to the master cylinder whether the lock washer has been inserted into the connecting sleeve. The additional component and the additional operation cause costs and represent an uncertainty factor.

In order to solve this problem, the connection comprises a transverse web in its flow cross sectional area, which covers the hole at least partially.

This permits the elimination of the lock washer because the assembly of the reservoir to the master cylinder immediately prevents the dropping out of the stop pin.

In a preferred embodiment, the connection is arranged in a connecting sleeve formed as an opening, which is aligned with the hole, and the connection is made by a fitting formed at the reservoir and a seal. In one embodiment of the invention the transverse web is formed in or at the fitting. The transverse weg is preferably arranged in the area of the free end of the fitting.

According to the invention the reservoir for a brake booster comprises a fitting which is adapted to connect the reservoir to the master cylinder, with the fitting being provided with a transverse web in its flow cross sectional area.

In another embodiment of the invention the transverse web is formed in or at the seal.

The seal for a brake booster with a reservoir comprising a fitting, where the fitting is adapted to connect the reservoir to the master cylinder, is designed so as to surround the fitting and comprises a transverse web which fits over the free end of the fitting. In other words, the seal has an essentially trough shaped longitudinal section, with the bottom of the trough being formed by the transverse web. Alongside the transverse web there are passage holes for the brake fluid. The transverse web can also be so configured that it does not extend over the entire diameter of the bottom, but from the seal edge to approximately the centre.

The configuration of the transverse web at or in the fitting as well as the configuration of the transverse web at or in the seal provides for the transverse web to be so dimensioned that in the final assembly condition of the reservoir at the master cylinder it prevents a dropping out of the stop pin without affecting the brake fluid flow.

Further embodiments, advantages and details of the invention will become apparent from the description and the accompanying drawings, in which.

Figure 1:
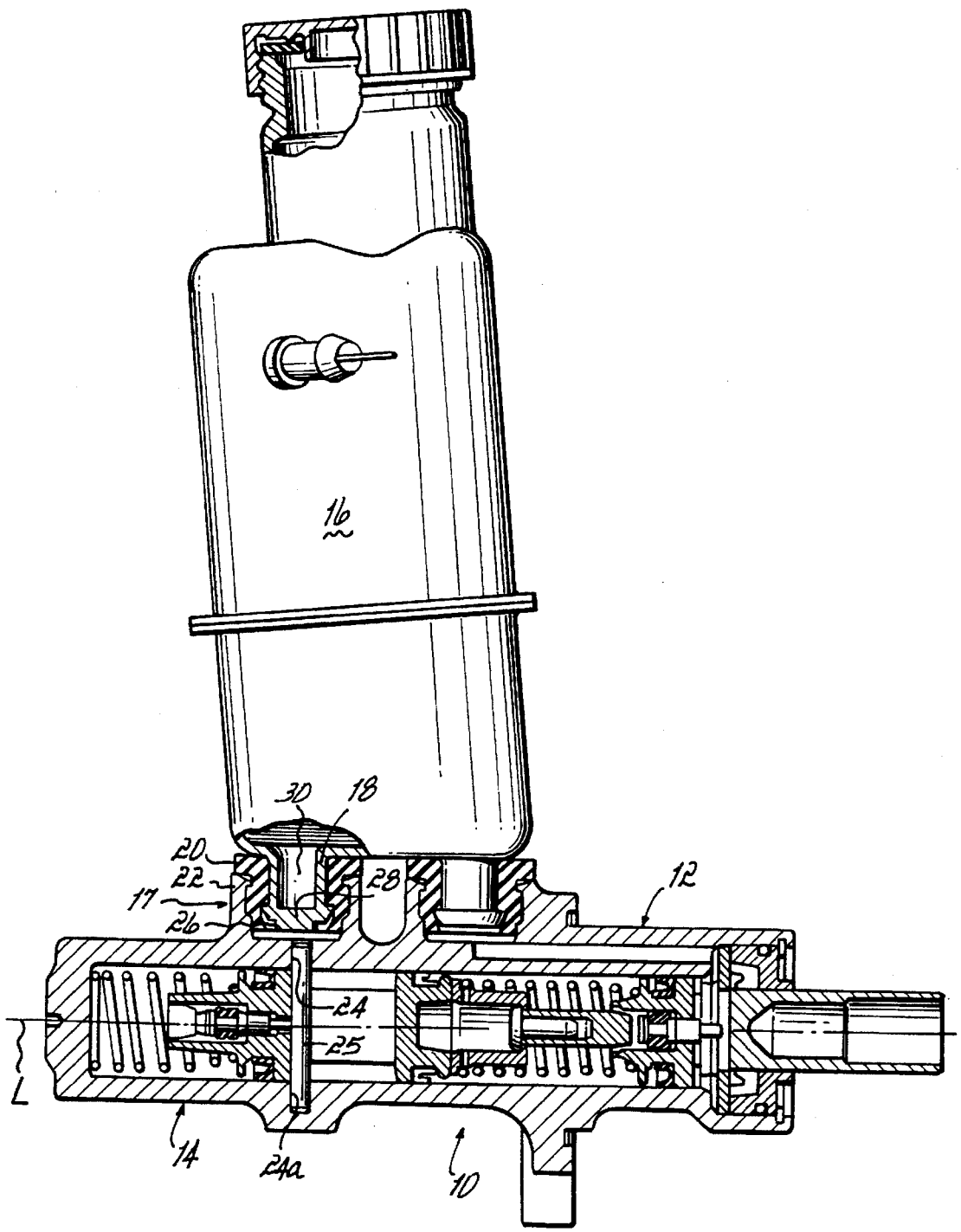
FIG. 1 shows a longitudinal section through a master cylinder with a flange mounted reservoir according to the invention.

FIG. 1 shows a master cylinder 10 comprising a primary piston 12 and a secondary piston 14. At the master cylinder 10 a reservoir 16 is attached containing brake fluid. The reservoir 16 has an essentially hollow cylindrical shape and at its end facing the master cylinder 10 it comprises a connection 17 which is formed by a fitting 18 and a seal 20 surrounding the fitting. The connection 17 is accepted in a fluid tight manner in a connecting sleeve 22 of the master cylinder. The bottom of the connecting sleeve 22 comprises a hole 24 which on the diametrically opposed side opens into a blind hole 24a. This hole 24 and the blind hole 24a, respectively, accept a stop pin 25 which limits the axial movability of the secondary piston 14 along a longitudinal axis L.

Figure 2:
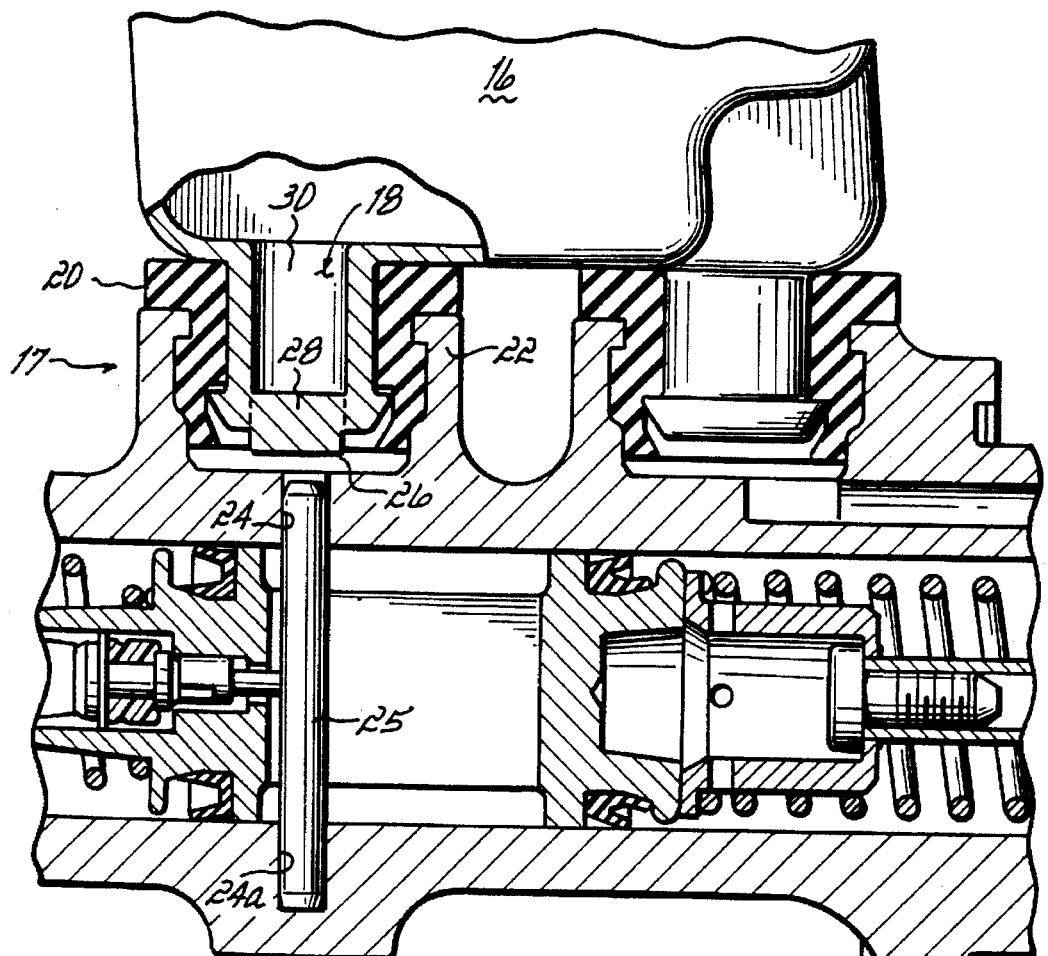
FIG. 2 shows an enlarged portion of FIG. 1.
Figure 3A:
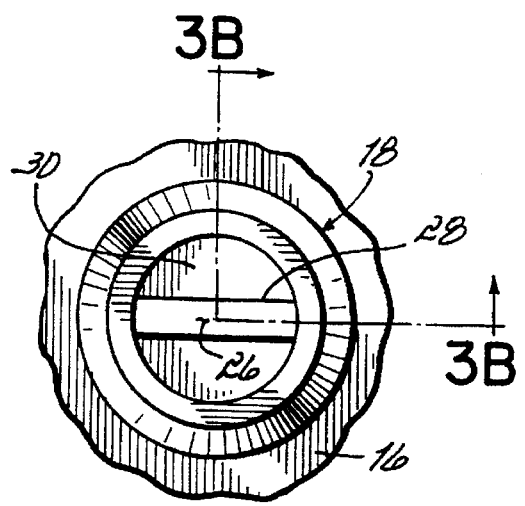
FIG. 3A shows an enlarged bottom view of the fitting of the reservoir.
Figure 3B:
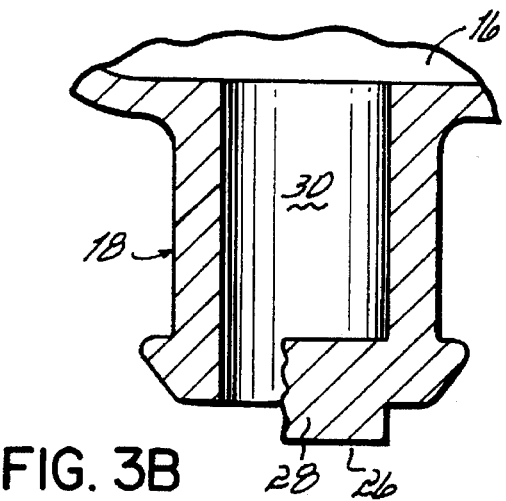
FIG. 3B shows a sectional view of the fitting of FIG. 3A along lines 3B—3B

As shown in FIG. 2, in the fitting 18 at its free end 26 a transverse web 28 is formed which extends diametrically over the entire inner diameter of the fitting 18. As can be seen from FIGS. 3a, 3b the transverse web 28 covers only 10 to 20 percent of a passage hole 30 of the fitting so that the flow of the brake fluid from the reservoir 16 into the master cylinder 10 is still unaffected. The hole 24 is so arranged in the master cylinder 10 that it is in alignment with the web 28, with the reservoir in its installed position. Thus the stop pin 25 inserted into the hole 24 or the blind hole 24a, respectively, cannot drop out of the hole or the blind hole 24a, respectively, (into the reservoir 16). The stop pin 25 can be provided with a longitudinal hole with a radial opening (not shown) in order to permit the brake fluid to flow from the reservoir 16 into the interior of the master cylinder 10. In addition to the hole 24a one or several additional holes (not shown) can be provided in a bottom 22a of the connecting sleeve 22, which extend into the interior of the master cylinder 10. The transverse web can either have the approximately rectangular cross section as illustrated, or a more advantageous cross section under fluid mechanics considerations.

Figure 6:
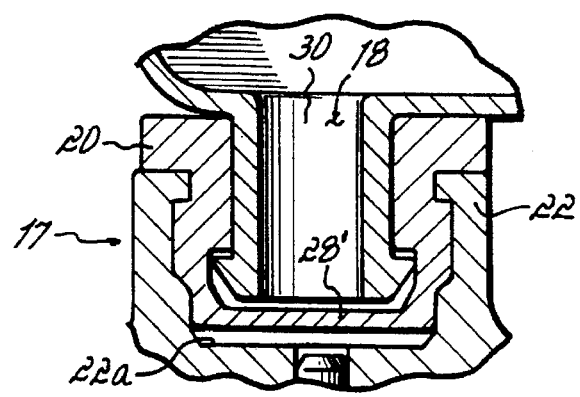
FIG. 6 is an enlarged cross-sectional view of an alternative embodiment of the fitting of the reservoir.

According to another embodiment of the invention as shown in FIG. 6, a transverse web 28' can also be formed at or in the seal 20 instead of the transverse web 28 in the fitting 18. In this case the seal 20 is so designed that it surrounds the fitting 18 annularly and that it comprises the transverse web 20' in a bottom 22a facing the connecting sleeve 22 which fits over the free end of the fitting 18. In this case, too, the arrangement is such that the transverse web 20' can be installed in the connecting sleeve 22 so as to be in alignment with the hole 24 or the blind hole 24a, respectively.

Figure 4:
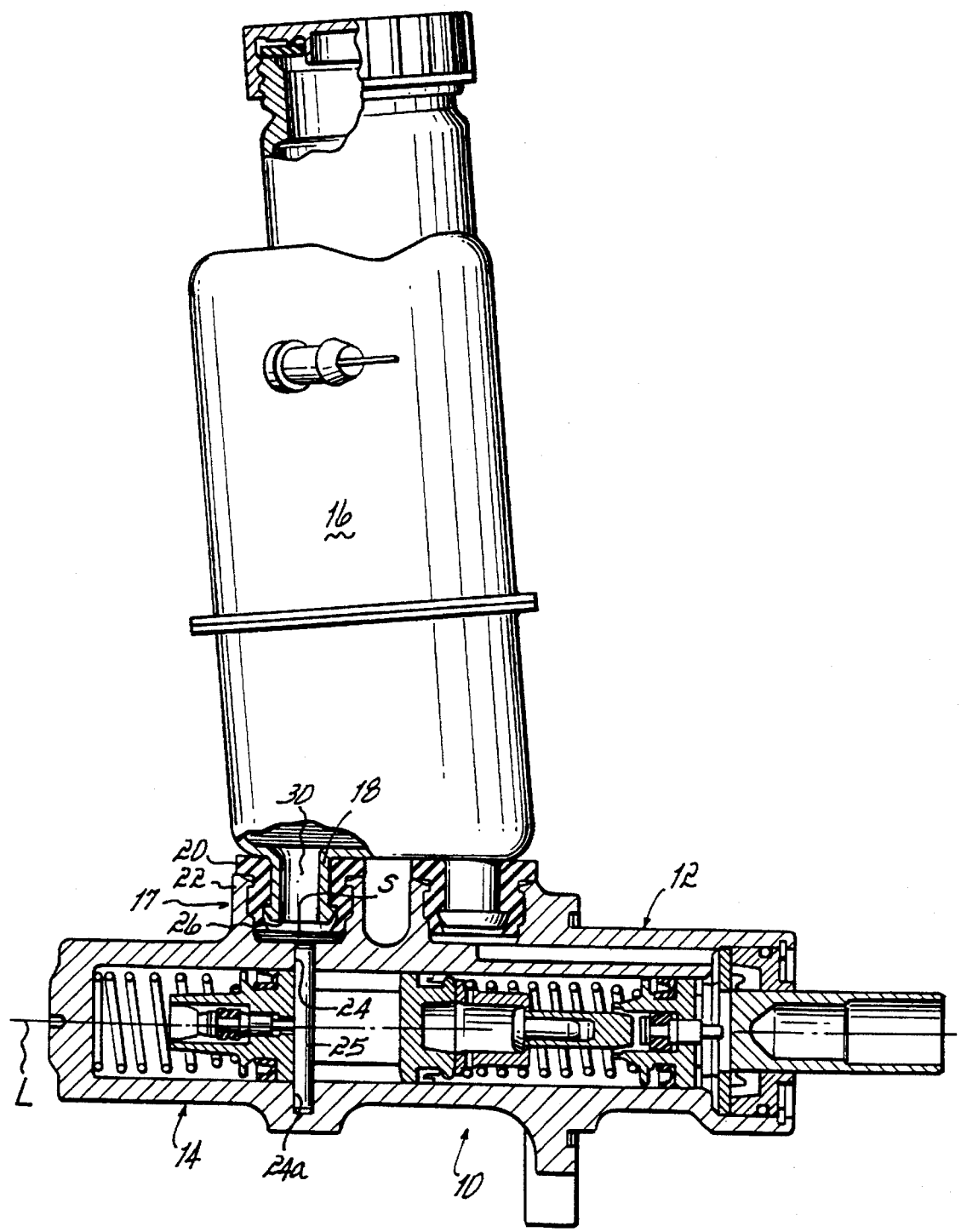
FIG. 4 shows a longitudinal section through a master cylinder with a flange mounted reservoir according to the state of the art.
Figure 5:
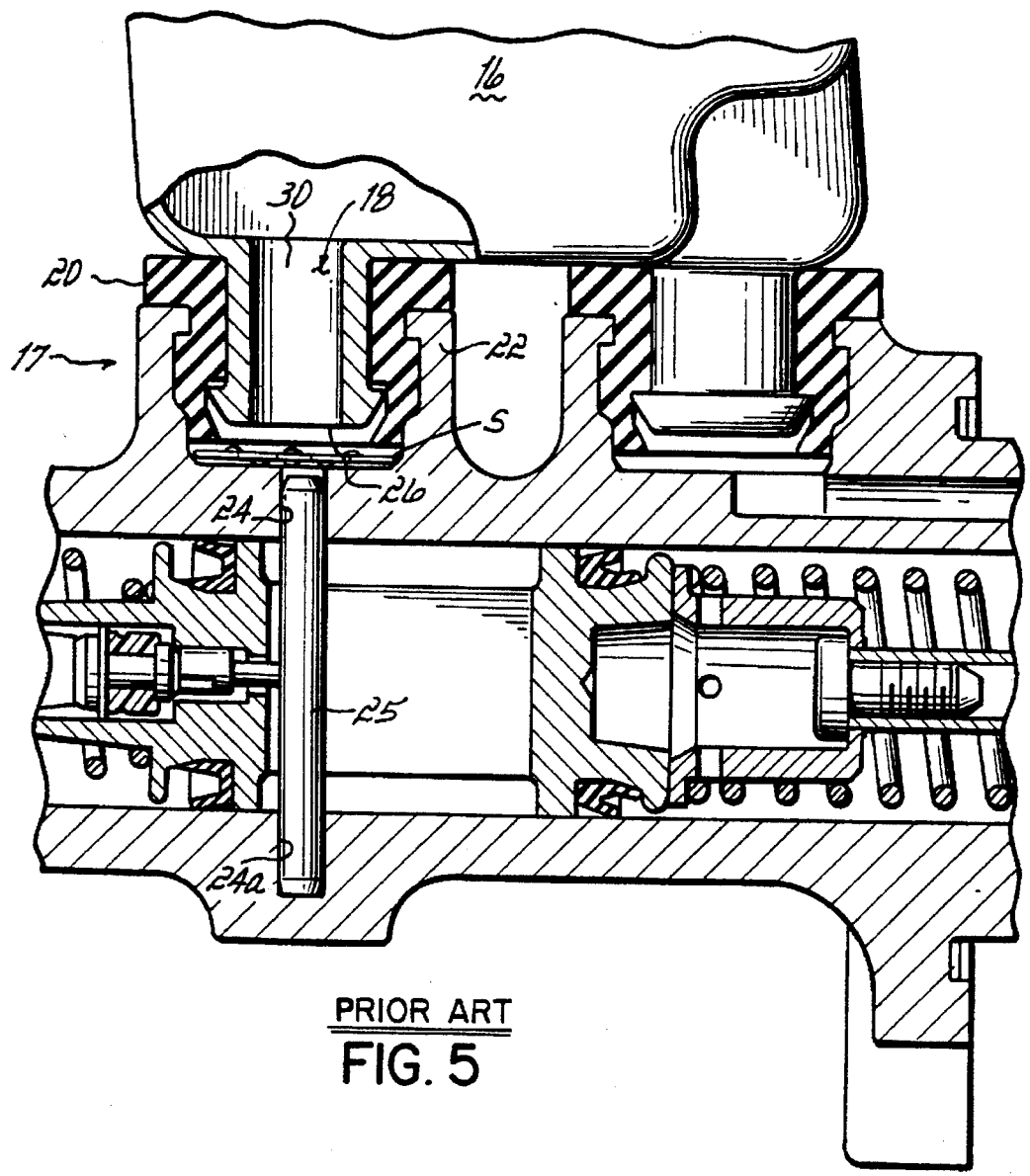
FIG. 5 shows an enlarged view of the master cylinder of FIG. 4.

The manufacture of the seal 20 with the transverse web 20' may be more cost effective than the configuration of the fitting 18 with the transverse web 28. With the transverse web 28 in the fitting 18, however, the precise alignment of the transverse web 28 with the hole 24 or the blind hole 24a, respectively, can be ensured more easily than with a rotation symmetrical seal 20, due to the orientation of the reservoir 16 coaxially with the longitudinal axis L of the master cylinder 10. With the seal 20 the transverse web 28 can also be designed grid shaped so that even with a random orientation of the seal 20 in the connecting sleeve 22 it is ensured that the stop pin 25 cannot drop out of the hole 24 or the blind hole 24a, respectively. FIGS. 4 and 5 illustrate the initially described state of the art. The same reference numerals as used in FIGS. 1 through 3A, 3B serve to identify identical parts. In the following their repeated description can therefore be dispensed with.

Compared to the invention, the state of the art does not provide for the transverse web 28 built into the fitting 18. Instead of it, a lock washer S is placed on the bottom 22a of the connecting sleeve 22. This lock washer S comprises several break-throughs and webs, so that in this case, too, the stop pin 25 is prevented from dropping out of the hole 24 or the blind hole 24a, respectively, (into the assembled reservoir 16).

I claim:

1. A brake booster comprising:

a master cylinder (10) including a primary piston (12) and a secondary piston (14), with the secondary piston (14) being limited in its axial movability by a stop pin (25) which is accepted in a hole (24) extending transversely to a longitudinal axis (L) of the master cylinder, a reservoir (16) for brake fluid, comprising a connection (17) via which the reservoir (16) is connected with the master cylinder (10), with the connection (17) being arranged in a radial extension of the stop pin (25), and the connection (17) including a transverse web (28) spanning a cross sectional area thereof, whereby the transverse web (28) partially covers the hole (24) to prevent the stop pin (25) from moving from the hole (24).

2. A brake booster according to claim 1, characterized in that the connection (17) is installed in an opening (22) in the master cylinder (10), which is in alignment with the hole (24), and the connection (17) is formed by a fitting (18) formed on the reservoir (16) and a seal (20).

3. A brake booster according to claim 2, characterized in that the transverse web (28) is formed in or at the fitting (18).

4. A brake booster according to claim 3, characterized in that the transverse web (28) is arranged in the area of the free end of the fitting (18).

5. A reservoir (16) for a brake booster comprising:

a fitting (18) adapted to connect the reservoir (16) with a master cylinder (10), and defining a flow region therebetween, the fitting (18) having a transverse web which spans a cross sectional area of the flow region, the transverse web adapted to permit fluid flow through the flow region and to prevent movement into the flow region of a stop pin (25) located in a hole (24) in the master cylinder (10), the hole (24) aligned with the flow region.

6. A brake booster according to claim 2, characterized in that a transverse web (20') is formed in or at the seal (20).

7. A seal (20) for a brake booster comprising a reservoir (16) with a fitting (18), the fitting (18) having a free end adapted to connect the reservoir (16) with the master cylinder (10), the seal (20) designed to surround the fitting (18), and the seal (20)

including a transverse web (28) which spans the free end of the fitting (18), the transverse web adapted to permit fluid flow between the reservoir (16) and the master cylinder (10) and to prevent movement into reservoir (16) of a stop pin (25) located in a hole (24) in the master cylinder (10) when the hole (24) is aligned with the fitting (18).

* * * * *